United States Patent [19]
Xiong

[11] Patent Number: 5,641,407
[45] Date of Patent: Jun. 24, 1997

[54] METHOD FOR TREATING INDUSTRIAL EFFLUENT

[75] Inventor: Feng Xiong, Basingstoke, England

[73] Assignee: Air Products and Chemicals, Inc., Allentown, Pa.

[21] Appl. No.: 590,975

[22] Filed: Jan. 24, 1996

[30] Foreign Application Priority Data

Jan. 25, 1995 [GB] United Kingdom ............... 9501401

[51] Int. Cl.$^6$ ........................................ C02F 1/52
[52] U.S. Cl. ............... 210/710; 210/721; 210/724; 210/760; 210/763; 210/908; 210/909
[58] Field of Search .................. 210/710, 713, 210/721, 724, 758, 759, 760, 908, 909, 762, 763

[56] References Cited

U.S. PATENT DOCUMENTS

| | | | |
|---|---|---|---|
| 3,901,804 | 8/1975 | Ohuchi et al. | 210/721 |
| 4,049,545 | 9/1977 | Horvath | 210/28 |
| 4,717,484 | 1/1988 | Kauffer | 210/711 |

FOREIGN PATENT DOCUMENTS

| | | | |
|---|---|---|---|
| 50-142466 | 11/1975 | Japan . | |
| 54-62655 | 5/1979 | Japan | 210/721 |
| 56-168879 | 12/1981 | Japan | 210/760 |
| 1130539 | 12/1984 | U.S.S.R. | 210/760 |

*Primary Examiner*—Peter A. Hruskoci
*Attorney, Agent, or Firm*—Willard Jones, II

[57] ABSTRACT

Hydrophobic organic substances are separated from aqueous industrial effluent containing said hydrophobic organic substances and hydrophilic organic substances by adding to the effluent at substantially neutral pH a salt of a metal having an insoluble hydroxide thereby forming an hydroxide sludge entraining said hydrophobic, oxidizable organic substances, and separating the sludge from the treated effluent containing the hydrophilic organic substances. The invention has particular application to the removal of toxic hydrophobic, oxidizable organic substances from aqueous industrial effluent and their subsequent destruction by oxidation, especially ozonation, of the separated sludge, thereby reducing the oxygen demand compared with oxidation of the entire effluent to reduce said toxic substances to their discharge consent level.

10 Claims, 1 Drawing Sheet

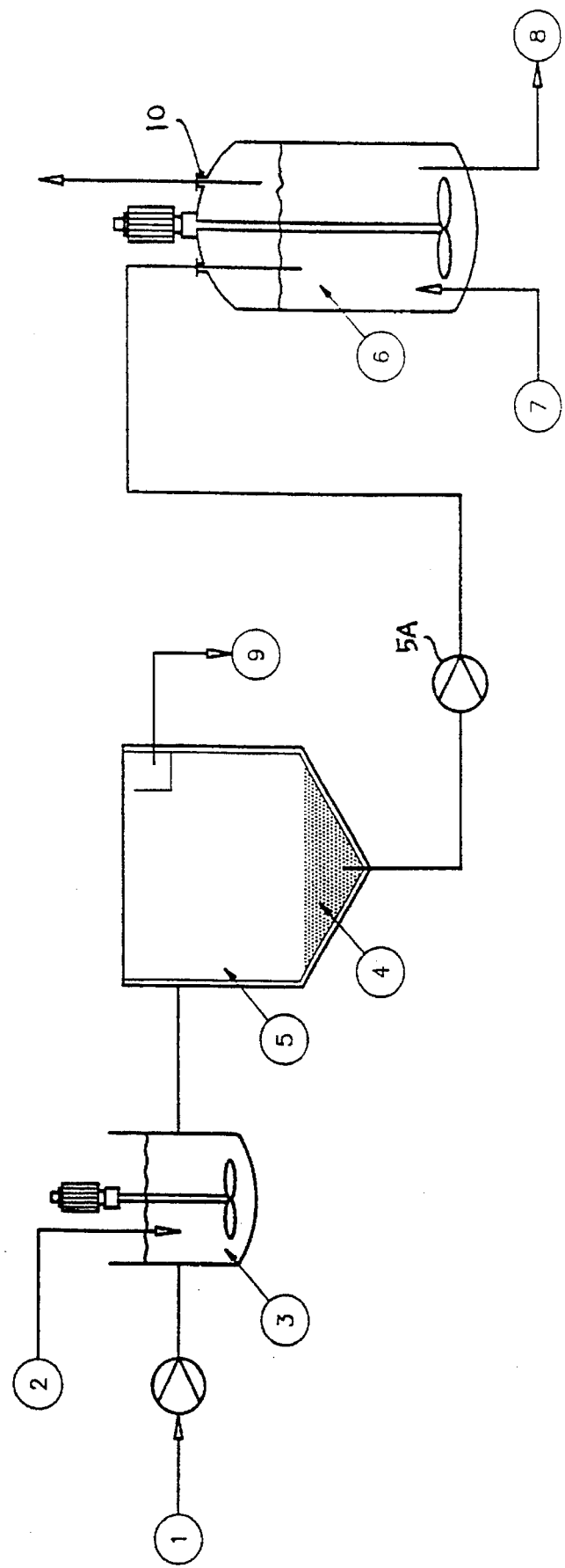

METHOD FOR TREATING INDUSTRIAL EFFLUENT

FIELD OF THE INVENTION

The present invention relates to the treatment of aqueous industrial effluent which contains relatively small concentrations of toxic organic substances and relatively large concentrations of less-toxic organic waste.

BACKGROUND OF THE INVENTION

Many industries still rely on the municipal sewage treatment works as a disposal route for their aqueous effluents. This is usually the most cost effective treatment process, provided that the sewage treatment works can accommodate these waste streams. However some toxic organic substances present in these industrial effluents pass through a conventional sewage treatment works without being sufficiently removed and/or destabilise the sewage treatment system. This has resulted in more and more strict control on industrial waste water discharge, called Trade Effluent Control. The control of toxic materials known as "red list" substances (a term used in the UK equivalent to the "priority pollutants" in the USA) is particularly stringent, and the discharge consents for many of the red list substances are on the order of ppb (parts per billion). The concentrations of such substances in industrial effluents are often on the order of hundreds ppb, compared to on the order of thousands ppm (parts per million) of other organic substances. Current treatment processes such as activated carbon adsorption and oxidation are not selective to the red list substances, which are only degraded after most of the other organic substances have been destroyed.

Current processes for dealing with red list substances normally utilise on-site treatment plant. Since most of the other organic substances are removed to the same order of concentration level when the red list substances content is reduced to the relevant discharge consent level, this is very expensive both in capital investment and operation cost compared with if the municipal sewage treatment works had to treat only those organic substances having discharge consents well above that for the red list substances.

JP-A-50142466 (CA 84(12):79406c) discloses the oxidation with ozone and subsequent dewatering of an iron-containing sludge produced during flocculation of waste water with ferrous sulphate at pH 10.2. Reportedly, the ozonation oxidises the precipitated ferrous hydroxide to ferric oxide and thereby markedly decreases sludge formation compared with conventional treatment with hydrated lime. In particular, when a sludge obtained by treatment of one litre of a dye-containing waste water with ferrous sulphate was oxidised with 90 mg ozone, the volume of sludge formed was 70 $cm^3$. After dewatering, the volume of the remaining sludge cake was 14 $cm^3$. This compared with volumes of 210 $cm^3$ and 21 $cm^3$, respectively, when the slurry was oxidized with 20% $Ca(OH)_2$.

U.S. Pat. No. 4,049,545 discloses the treatment of waste water by addition of an alkaline coagulant aid to pH 9.0–10.5 and the subsequent addition of precipitating agents in at least two successive steps to lower the pH of the mixture by about pH 1 each step. Exemplified precipitating agents include aluminium and ferric salts. It is stated that, after the last precipitation step, the pH of the water should be between 6 and 8.5. There is no suggestion that selective precipitation should initially be carried out at pH 6 to 8 as required by the present invention. Further, there is no reference in the Application to oxidizing precipitated sludge.

U.S. Pat. No. 4,717,484 discloses a treatment of waste water in which a metal salt is added to form a flocculated mixture of metal hydroxide and organic sludge. After degasification and separation from the treated water, the metal salts in the flocculated mixture are dissolved by increasing pH and recycled as flocculant. Exemplified flocculants are aluminium and iron salts. There is no reference to selected precipitation of particular organic waste by control of pH prior to addition of the flocculant and no reference to oxidation of the precipitated sludge.

Many surface water treatment plants and industrial waste water treatment works employ chemical precipitation reagents such as metal salts, especially Fe or Al salts, to remove organic material by charge neutralisation thereof and co-precipitation/adsorption. These processes generate a large quantity of sludge which usually is settled out from the treated water in a settling tank or floated off the treated water via a dissolved air flotation process. This sludge can then be thickened and dewatered and sent off-site for disposal. This practice involves operational costs for both reagent consumption and sludge disposal. Currently all attempts to reduce cost have been directed towards the reduction in sludge disposal cost, for example by improving sludge dewatering thereby reducing the volume of sludge to be disposed of.

SUMMARY OF THE INVENTION

The Inventor has noted that many of the "red list" substances are oxidizable, hydrophobic organic substances, especially halogenated compounds, which are selectively precipitated with an hydroxide sludge formed on the addition of a salt of a metal having an insoluble hydroxide to aqueous effluent of essentially neutral pH. This provides a means of separating "red list" substances from the bulk of hydrophilic organic substances in the effluent, thereby permitting the remaining effluent to be discharged for treatment as sewage and dramatically reducing the extent of oxidation required to remove the "red list" substances (compared with oxidation in the original effluent). The red list substances include aldrin, atrazine, cyfluthrin, DDT, dieldrin, dizenon, pentachlorophenols, permethrin, propetanphos, and simazine.

In the present invention hydrophobic organic substances are separated from aqueous industrial effluent containing said hydrophobic organic substances and hydrophilic organic substances by adding to the effluent at substantially neutral pH a salt of a metal having an insoluble hydroxide thereby forming an hydroxide sludge entraining said hydrophobic, oxidizable organic substances, and separating the sludge from the treated effluent containing the hydrophilic organic substances. The invention has particular application to the removal of toxic hydrophobic, oxidizable organic substances from aqueous industrial effluent and their subsequent destruction by oxidation, especially ozonation, of the separated sludge, thereby reducing the oxygen demand compared with oxidation of the entire effluent to reduce said toxic substances to their discharge consent level.

BRIEF DESCRIPTION OF THE DRAWING

The single FIGURE of the drawing is a diagrammatic representation of apparatus for treating waste water in accordance with the presently preferred embodiment of the invention.

DETAILED DESCRIPTION OF THE INVENTION

In its broadest aspect, the present invention provides a method of separating hydrophobic organic substances from aqueous industrial effluent containing said hydrophobic, organic substances and hydrophilic organic substances, comprising adding to the effluent at pH 6 to 8 a salt of a metal having an insoluble hydroxide thereby forming an hydroxide sludge entraining said hydrophobic, oxidizable organic substances, and separating the sludge from the treated effluent containing the hydrophilic organic substances.

According to a second aspect, the present invention provides a method of destroying hydrophobic, oxidizable organic substances in aqueous industrial effluent containing said hydrophobic, organic substances and hydrophilic organic substances, comprising adding to the effluent at pH 6 to 8 a salt of a metal having an insoluble hydroxide thereby forming an hydroxide sludge entraining said hydrophobic, oxidizable organic substances; separating the sludge from the treated effluent containing the hydrophilic organic substances; and subjecting said sludge to oxidising conditions to oxidize said hydrophobic, oxidizable organic substances.

The invention has particular application to the separation of hydrophobic organic substances from aqueous industrial effluent containing relatively small concentrations of said hydrophobic, organic substances and relatively large concentrations of hydrophilic organic substances. As indicated above, the concentration of hydrophilic organic substances is often on the order of 10 or more times that of the hydrophobic, organic substances. Usually, the concentration of hydrophobic, organic substances in the aqueous effluent is on the order of 1 to 1000 ppb, and the concentration of the hydrophilic organic substances in the effluent is on the order of 1,000 to 100,000 ppm.

The invention provides the advantage that toxic substances from the effluent are separated and then degraded in a much reduced volume, leaving the bulk organic load, to be treated by the most cost effective way, for example in a municipal sewage treatment works.

Preferably the metal salt is a water-soluble salt of a metal having two or more oxidation states, such as aluminum, chromium, iron, and manganese. Presently, the most preferred metal salts are Fe(III) or Al(III) salts, especially chlorides or sulphates and particularly $Fe_2(SO_4)_3$.

In order to avoid reaction of the metal salt with organic substances in the effluent to form insoluble salts by charge neutralization, the effluent must be maintained at substantially neutral pH (pH 6 to 8) during the salt is added. Thus, it may be necessary to adjust the pH of the effluent before or during addition of the metal salt by addition of a suitable acid or base. Preferably, the effluent is at about pH 7 during the salt addition.

Usually, the hydrophilic, oxidizable, organic content of the hydroxide sludge will be destroyed by oxidation. The oxidised sludge can be disposed of by thickening and dewatering and discharging the dewatered sludge separately from the treated effluent, from which the toxic substances have been removed. Thus, by way of example, the oxidised sludge may be disposed of on-site, and only the supernatant liquid from the oxidized and/or dewatered sludge disposed of to a municipal land drain. Alternatively, the oxidised sludge may be recombined with the treated effluent, and the combined effluent treated by the municipal sewage works to remove the hydrophilic organic substances to the relevant discharge consent level. If required, at least a portion of the oxidized sludge, preferably after dewatering, can be treated to regenerate metal salt and thereafter recycled for mixing with further aqueous effluent.

The sludge oxidation step usually will be conducted by ozonation, although other oxidative methods, such as with oxygen at elevated pressure and temperature, can be used. Usually, the ozonation will be conducted at ambient temperature and pressure. Preferably, the metal cation of the salt is selected to catalyse the oxidation.

Conveniently, the metal salt is added to the aqueous effluent in a mixing chamber with a residence time sufficient to permit formation of the sludge, usually 1 to 5 minutes. The resultant mixture can then be fed to a settling tank for sufficient time for the sludge to settle, usually 10 to 30 minutes, and the sludge and treated effluent separately removed from the tank. Alternatively, the mixture can be separating by dissolved air flotation or other conventional separation method.

Referring to the preferred embodiment shown in the accompanying drawing, industrial aqueous effluent such as waste water from textile industry processes or landfill leachate, is fed to an effluent inlet 1. Typically the waste water contains hydrophobic, toxic organic substances such as halogenated pesticides at a level on the order of 1 to 1000 ppb, the main waste material in the effluent being hydrophilic relatively non-toxic organic substances which are present at a level on the order of 1,000 to 100,000 ppm, the latter presenting overwhelmingly the greater chemical oxygen demand (COD). Current treatment processes such as activated carbon adsorption and oxidation are not selective to the toxic materials, which can only be degraded after most of the organic substance content is destroyed. In contrast, the treatment of the present embodiment selectively separates the toxic substances from the waste water and then degrades them in a much reduced volume, leaving the bulk organic load to be treated in the municipal sewage treatment works.

In the embodiment of the FIGURE, the aqueous effluent to be treated is mixed with $Fe_2(SO_4)_3$ supplied through a salt inlet 2 to a mixing chamber 3 in which the coagulation takes place. If necessary, the pH of the effluent is adjusted to substantially neutral with, for example, either $H_2SO_4$ or NaOH. In the mixing chamber 3, the salt/effluent mixture is mixed by a rotary agitating paddle and there is rapid precipitation of ferric hydroxide. Toxic hydrophobic substances are entrained in the precipitate, leaving less-toxic hydrophilic substances in the effluent. The resulting mixture is fed to a settling tank 5, where the sludge 4 is settled and separated from the treated effluent. The sludge 4 is then pumped by pump 5A from the settling tank 5 to an ozonation reactor 6 where the toxic substances are destroyed by oxidation with ozone gas supplied via inlet 7. The oxidation by the ozone gas is catalysed by the iron species in the sludge. Spent gas exhausts from the reactor 6 through a outlet 10.

The oxidized sludge is drawn off at an outlet 8 and, being free of toxic substances, can be mixed with the treated effluent drawn off from the settling tank 5 at an outlet 9 and then discharged to the municipal treatment works for conventional sewage treatment to remove the bulk of organic matter in the waste water. As an alternative, the oxidized sludge emerging at the outlet 8 can be thickened and dewatered by centrifuging, or other solid/liquid separation methods, in a separator (not shown). In such a case the treated effluent emerging at outlet 9, which is free from toxic substances, can be discharged directly to the municipal sewer. If desired, am least a portion of the dewatered sludge can be treated to regenerate the metal salt and then recycled to the mixing chamber 3 to reduce both the metal salt requirement and the amount of sludge requiring disposal.

EXAMPLE

A 20 l sample of effluent from a composite dye house (textile industry with the following composition: chemical oxygen demand 3500 mg/l red list substances such as dieldrin, dizenon, cyfluthrin, permethrin, and propetanphos at 10 to 200 ppb concentrations) was intensively (600 rpm) mixed with 10 cm$^3$ 50% w/v Fe$_2$(SO$_4$)$_3$ solution and 5 cm$^3$ 40% w/v NaOH solution for 2 minutes. The mixture was left in the container to settle with mild mixing at 20 rpm for 30 minutes. The supernatant liquid was free from red list substances (<10 ppb; the detection limit) and hence was suitable for discharge to the municipal sewer. The settled sludge (about 2 l), containing the red list substances from the initial effluent sample at concentrations ranging from 100 to 2000 ppb, was then treated with 1360 mg of ozone to decompose the red list substances to below 10 ppb. The resultant ozone treated sludge was suitable for discharge to the municipal sewer.

It will be appreciated that the process described allows the toxic (red list) substances to be destroyed completely without much degradation of the bulk organic load, thereby significantly reducing the chemical oxygen demand at the municipal sewage works. As the volumetric load of the hydrophobic substances precipitated with the sludge is only 5 to 10% of the total effluent load, the ozone (or other oxidant) consumption required to remove toxic substances by the process of the invention is very low and hence the process is very cost effective. In contrast, the known unselective methods, which oxidize both toxic and less-toxic substances, has substantial chemical oxygen demand, thus entailing excessive cost. By way of example, in the process exemplified above an ozone dosage of only 68 mg/l achieved destruction of target compounds to below 10 ppb, the discharge consents level. Without the process of the invention, an excessive dosage of more than 2,000 mg/l ozone did not meet the discharge consents level, because most of the ozone was used up by the bulk organic load. Activated carbon absorption would completely fail in the task, because the carbon would be very quickly saturated by the bulk organic load before any removal of the toxic substances.

It will be appreciated that the invention is not restricted to the specific details of the embodiment described above and that numerous modifications and variations can be made without departing from the scope of the invention as defined in the following claims.

What I claim is:

1. A method of destroying hydrophobic, oxidizable organic substances, including aldrin, atrazine, cyfluthrin, DDT, dieldrin, dizenon, pentachlorophenols, permethrin, propetanphos, or simazine, in aqueous industrial effluent containing said hydrophobic, oxidizable, organic substances in a concentration on the order of 1 to 1,000 ppb and hydrophilic organic substances in a concentration on the order of 1,000 to 100,000 ppm comprising adding to the effluent at about pH 6 to about pH 8 a salt of a metal having an insoluble hydroxide thereby forming an hydroxide sludge entraining said hydrophobic, oxidizable organic substances; separating the sludge from the treated effluent containing the hydrophilic organic substances; and subjecting said separated sludge to oxidising conditions to oxidize said hydrophobic, oxidizable organic substances.

2. The method according to claim 1, wherein the oxidised sludge is disposed of by thickening and dewatering and disposing of the dewatered sludge separately from the treated effluent, from which the toxic substances have been removed.

3. The method according to claim 1, wherein the oxidised sludge is recombined with the treated effluent, and the combined effluent treated to remove the hydrophilic organic substances.

4. The method according to claim 1, wherein said oxidation is conducted using ozone.

5. The method according to claim 1, wherein the metal species of said salt catalyses said oxidation.

6. The method according to claim 1, wherein the metal salt is a water-soluble salt of a metal having two or more oxidation states.

7. The method according to claim 6, wherein the metal salt is an Fe(III) or Al(III) salt.

8. The method according to claim 7, wherein the metal salt is ferric sulphate.

9. The method according to claim 1, wherein the aqueous effluent is at about pH 7 during the salt addition.

10. A method of destroying hydrophobic, oxidizable organic substances, including aldrin, atrazine, cyfluthrin, DDT; dieldrin, dizenon, pentachlorophenols, permethrin, propetanphos, or simazine, in aqueous industrial effluent containing said hydrophobic, oxidizable, organic substances in a concentration on the order of 1 to 1,000 ppb and hydrophilic organic substances in a concentration on the order of 1,000 to 100,000 ppm, comprising adding to the effluent at about pH 6 to about pH 8 a salt of a metal having an insoluble hydroxide thereby forming an hydroxide sludge entraining said hydrophobic, oxidizable organic substances; separating the sludge from the treated effluent containing the hydrophilic organic substances; and subjecting said separated sludge to treatment with ozone to oxidize said hydrophobic, oxidizable organic substances.

\* \* \* \* \*